United States Patent [19]

Brighton

[11] Patent Number: 4,473,210

[45] Date of Patent: Sep. 25, 1984

[54] LABYRINTH TRIM VALVE

[76] Inventor: John A. Brighton, c/o Copes-Vulcan, Inc., P.O. Box 577, Lake City, Pa. 16423

[21] Appl. No.: 363,655

[22] Filed: Mar. 30, 1982

Related U.S. Application Data

[60] Continuation of Ser. No. 150,071, May 15, 1980, , which is a division of Ser. No. 960,248, Nov. 13, 1978, Pat. No. 4,258,750.

[51] Int. Cl.³ .......................... F16K 47/04; F15D 1/00
[52] U.S. Cl. .................................. 251/127; 137/625.3; 137/625.37; 138/43
[58] Field of Search ...................... 137/625.3, 625.37; 138/43, 46; 251/127

[56] References Cited

U.S. PATENT DOCUMENTS

| | | |
|---|---|---|
| 1,342,955 | 6/1920 | Gebhardt . |
| 3,131,717 | 5/1964 | Gratzmaller . |
| 3,917,221 | 11/1975 | Kubota et al. . |

FOREIGN PATENT DOCUMENTS

| | | | |
|---|---|---|---|
| 990616 | 6/1976 | Canada . | |
| 1005727 | 2/1977 | Canada . | |
| 1008977 | 11/1957 | Fed. Rep. of Germany ... | 137/625.3 |
| 2641761 | 9/1977 | Fed. Rep. of Germany . | |
| 1023845 | 1/1953 | France . | |
| 2285556 | 4/1976 | France . | |
| 170936 | 12/1945 | Japan . | |
| 52-75838 | 6/1977 | Japan . | |
| 52-81720 | 7/1977 | Japan . | |
| 53-114526 | 10/1978 | Japan . | |
| 1108817 | 4/1968 | United Kingdom . | |

*Primary Examiner*—Arnold Rosenthal
*Attorney, Agent, or Firm*—Mandeville & Schweitzer

[57] ABSTRACT

A fluid flow restrictor for use in a high pressure valve or the like which comprises a series of closely interfitting concentric cylinders alternately attached to the valve seat and an axially movable valve plug of the valve. In one advantageous embodiment of the invention, various arrangements of slot openings are formed through the several cylinders. The slot openings may be of any geometric shape, for example, rectangular or trapezoidal, and are of sufficient volume to act as expansion chambers for a compressible fluid. The openings of each cylinder communicate with the openings of an adjacent cylinder by various overlapping relationships between openings or by viscous friction flow paths between the cylinders to form restricting flow paths therebetween. Axial displacement of the valve plug will move the interfitting cylinders with respect to one another to vary the flow path dimensions between the slot openings of the cylinders. In another specific form of the invention, the interfitting cylinders are slotless, providing a viscous friction flow path between cylinders and expansion chambers above the open ends of each cylinder and between adjacent cylinders.

2 Claims, 18 Drawing Figures

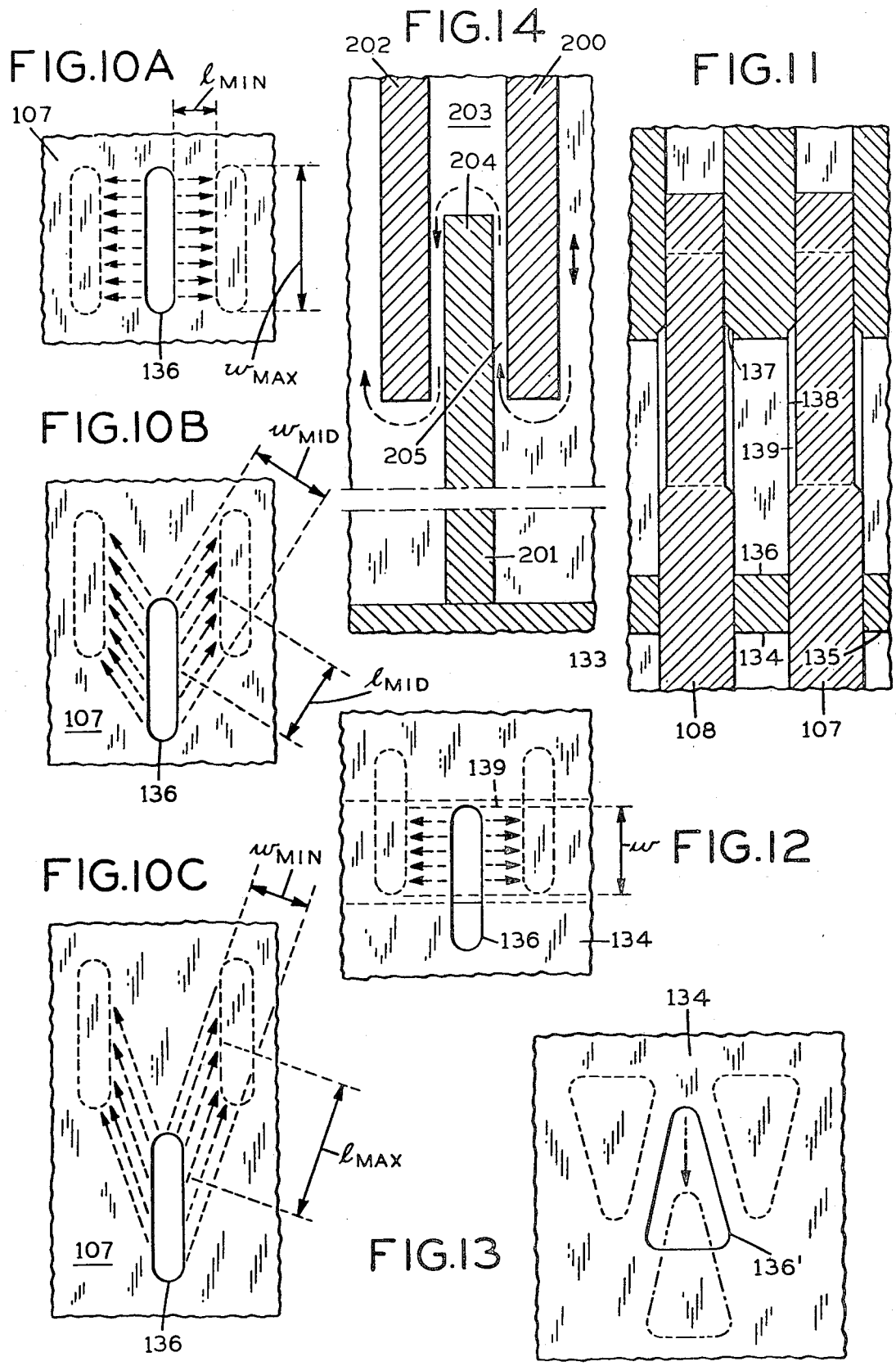

LABYRINTH TRIM VALVE

This is a continuation of application Ser. No. 150,071 filed May 15, 1980 in turn a division of application Ser. No. 960,248, filed Nov. 23, 1978 now U.S. Pat. No. 4,258,750.

BACKGROUND AND SUMMARY OF THE INVENTION

The present invention relates to a quiet valve, and more particularly to a novel and improved labyrinth trim to achieve an orderly and silent dissipation of fluid energy in a throttling process.

In a typical system utilizing fluid flowing at high velocity and under high pressure, it is often necessary to reduce the pressure and velocity of the fluid. Accordingly, many prior art devices have been proposed wherein a fluid flow restrictor means is arranged intermediate the inlet and outlet of a valve structure to effect a controlled, multiple stage dissipation of the fluid energy. In such a valve, the potential energy of the fluid is converted into kinetic energy by throttling the flow. The kinetic energy is then dissipated by a controlled turbulence. A problem associated with high pressure drop valves is the acoustic energy generated by the turbulence. The objectionable noise is caused primarily by sudden drops in pressure as the fluid flows through the valve. Therefore, the fluid is typically caused to flow through labyrinthine paths resulting in a gradual dissipation of energy either through multiple changes of direction, controlled and limited expansion, friction or a combination of these. The result is a pressure drop at any one stage of the fluid flow restrictor which is sufficiently low to avoid the generation of excessive noise and/or cavitation.

In many prior art devices of the above-described type, the fluid flow restrictor comprises a series of axially aligned and stacked discs. The discs are provided with various arrangements of fluid flow paths to effect the energy dissipation. The flow paths are uncovered by the axial motion of a close-fitting valve plug received in a cylindrical opening formed through the center of the stacked discs. In other devices, the axial movement of a valve plug uncovers small openings in a cylindrical sleeve. A problem with each of these types of devices is that the openings and fluid flow paths are prone to plugging or jamming by particulate matter in the flow stream. In still other devices, a tapered plug fits a tapered seat and the axial movement of the plug exposes a series of orifice lands and grooves formed on one or both of the mating parts. These devices are effective for only a small amount of plug lift, which is undesirable in applications requiring large flows with high pressure drops.

It is a primary objective of the present invention to provide a fluid flow control valve which is economical to manufacture, highly effective in controllably dissipating fluid energy, and which obviates the disadvantages of the above-discussed prior art devices. Generally, the valve disclosed herein comprises a plurality of closely interfitting concentric cylinders alternately fastened to the valve seat and valve plug. The valve plug is arranged for axial movement relative to the valve seat whereby the interfitting cylinders may be axially displaced with respect to one another. A plurality of slot-like openings are formed in each of the cylinders to act as limited expansion chambers for the fluid. The slots are arranged throughout the several concentric cylinders in various geometric patterns to provide restricting orifices or laminar flow paths for fluid communication between the openings of adjacent cylinders. In this manner, the fluid is permitted to flow through a series of expansion stages to gradually dissipate the kinetic energy and reduce fluid pressure without the generation of excessive noise and/or cavitation.

In accordance with one advantageous form of the invention, the openings are in the form of axially elongated rectangular slots. The slots of each cylinder overlap the slots of the adjacent, interfitting cylinder whereby the sharp corners on the sides of the slots define a restricting orifice between the openings. The orifice width is determined by the angular orientation between the interfitting cylinders and the orifice length is determined by the axial movement of the cylinders fastened to the valve plug. The cylinders may be constrained against rotation such that the orifice width is constant and the orifice length is a function of the axial movement of the valve plug providing an orifice area which varies linearly with plug travel.

To advantage, the cylinders may be oriented such that the right side edge of each opening always overlaps the left side edge of the adjacent opening whereby the fluid will flow in spiral paths with respect to the axis of the cylinders. In another advantageous form, the cylinders may be aligned whereby the right side edge of one opening overlaps the left side edge of the adjacent opening and the left side edge of the adjacent opening overlaps the right side edge of the next adjacent opening and so on. The fluid will flow along paths which are in a generally zig-zag pattern about radial lines of the cylinders.

In accordance with another specific form of the invention, the slots of each cylinder may be centered between the slots of adjacent cylinders and the mating relationship between the cylinders is such that a narrow spacing exists to define long flow paths of laminar dimensions between openings. As the fluid flows out of each slot it will be divided into two paths and flow circumferentially between the cylinders to the two adjacent slots of the adjacent cylinders. The velocity of the flowing fluid effectively limited by viscous friction at the cylinder walls. This embodiment is especially well suited for flow control with a fixed pressure differential.

In still another form of viscous friction control taught by the present invention, the concentric cylinders are unslotted and the fluid flow is axial between a first pair of mating cylinders into the open volume at the end of one of the cylinders and then into the clearance between the next adjacent pair of cylinders. This arrangement is particularly suited to pressure control applications.

Of course, the valve of the present invention may include other features. For example, the shape of the slot openings may be trapezoidal or triangular in shape to vary the width of the orifice in relation to axial movement of the valve plug. The cylinders attached to the valve plug also may be keyed for predetermined rotational movement as the valve plug is raised.

For a better understanding of these and other features and advantages of the present invention, reference should be made to the following detailed description of preferred embodiments and to the accompanying drawings.

BRIEF DESCRIPTION OF THE DRAWINGS

FIGS. 10A, 10B and 10C diagrammatically illustrate the change in flow path dimensions of the valve of FIG. 7 with axial movement of the valve plug.

FIG. 11 is another embodiment for the interfitting relation of the cylinders of the valve of FIG. 7.

FIG. 12 diagrammatically illustrates the fluid flow path defined by the embodiment of FIG. 11.

FIG. 13 illustrates a triangular geometry for the slot openings of the valve of FIG. 7.

FIG. 14 is a partial cross-sectional view of an embodiment of the invention utilizing slotless interfitting cylinders.

DETAILED DESCRIPTION OF PREFERRED EMBODIMENTS OF THE INVENTION

Figure 1:
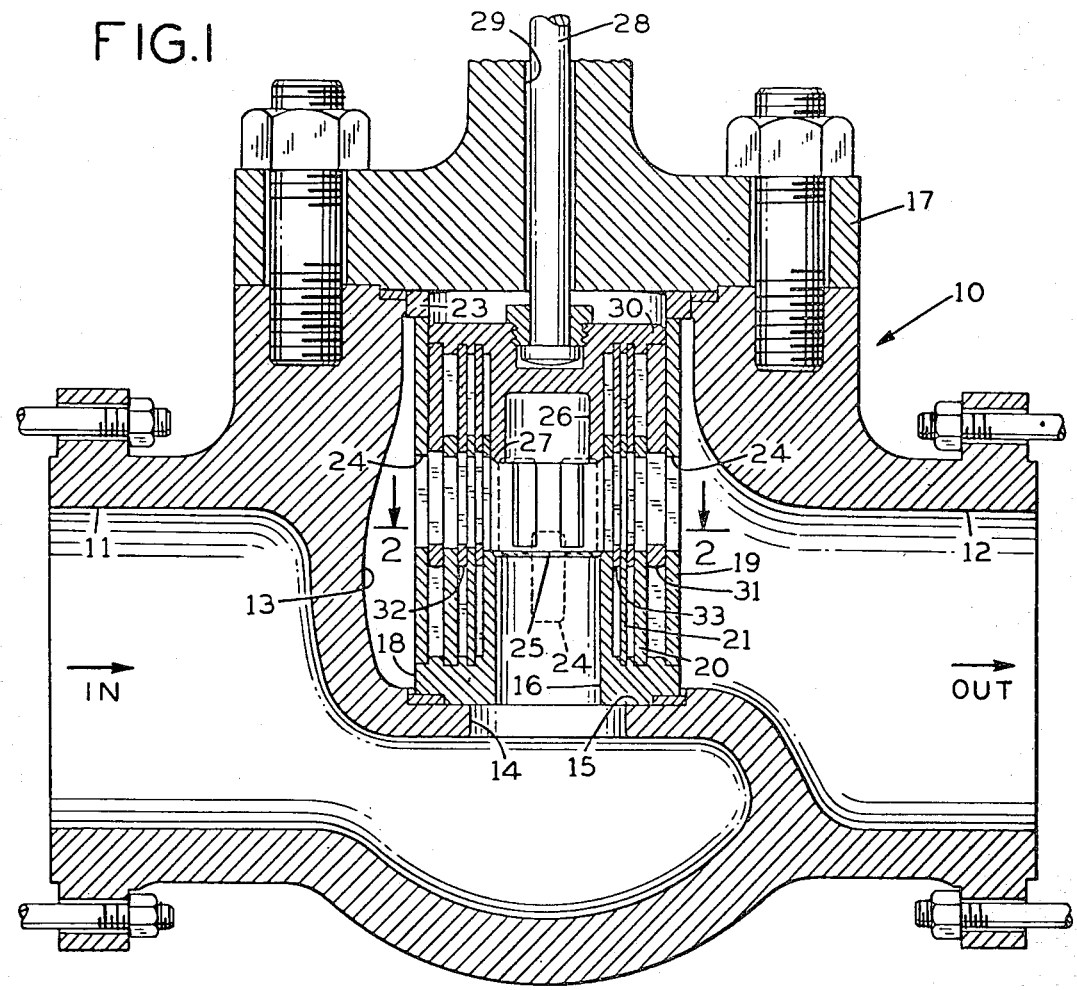
FIG. 1 is a longitudinal cross-sectional view of a high pressure valve incorporating a labyrinth trim constructed in accordance with the principles of the invention.

Referring now to the drawings and initially to FIG. 1 thereof, illustrating a valve for compressible fluid service, the reference numeral 10 designates generally a valve body of a fluid control valve. Valve body 10 includes an inlet passage 11 and an outlet passage 12. Intermediate the inlet and outlet passages 11, 12 is an internal web 13 provided with an opening 14 forming a valve passage and mounting the primary valve parts. Mounted upon an annular shoulder 15 formed at the opening 14 is a cylindrical number 16. A bonnet 17 is secured to the valve body 10 in a conventional manner, as for example, by bolts.

An annular flange 18 is integral with the cylindrical member 16 at the lower end thereof. A plurality of spaced, concentric cylinders 19–21 are securely mounted to the flange 18 and extend upwardly therefrom. The outer cylinder 19 extends upward to a sealed relation with an annular sealing ring 23, seated between the outer end of the cylinder 19 and bonnet 17, which forms a fluid-tight seal. Therefore, the cylinder 19, cylindrical member 16, web 13 and bonnet 17 form a sealed assembly, such that fluid flowing from the inlet passage 11 to the outlet passage 12 is required to flow through the member 16, slot-like openings 24, formed through the cylinder 19, and through the web 13 to the outlet passage 12.

The cylindrical member 16 includes a tapered annular valve seat 25 formed approximately mid-way of the internal surface of the cylindrical member 16. A valve plug 26 is a slidably received within the cylinder 16 for controlled vertical movement. The plug 26 includes a tapered annular valve surface 27 at the lower end thereof, which is arranged for cooperation with the tapered annular valve seat 25. When the plug 26 is in its lowermost position, the surface 27 mates with the valve seat 25 to completely close the valve. In the illustrated embodiment, vertical movement of the valve plug 26 is controlled by a valve stem 28 which extends up through a guide bore 29 formed in the bonnet 17 and is connected to a suitable actuator (not shown) such as a threaded hand wheel.

An annular flange 30 is formed integral with the upper portions of the valve plug 26 and is slidably received within the cylinder 19. A plurality of spaced, concentric cylinders 31, 32, 33 are securely mounted to the flange 30 and extend downwardly to a closely interfitting relation between the cylindrical member 16 and the cylinders 19, 20, 21, respectively.

Each of the interfitting cylinders 16, 19, 20, 21, 31, 32, 33 includes a plurality of rectangular slot openings 24. As is clearly illustrated in FIG. 2, the cylinders are oriented such that the right side edge 34 of each opening 24 overlaps the left edge 35 of the opening 24 of the adjacent upstream cylinder to form a restricting orifice between openings. The left edge-right edge overlap arrangement described is provided throughout the interfitting cylinders such that fluid flowing from the downstream cylinder to the upstream cylinder follows a somewhat spiral path 36.

Pursuant to the invention, the volume of each opening 24 is sufficient to form an expansion chamber for the flowing fluid. The width of the restricting orifices between openings is fixed by the angular relationship between adjacent cylinders, and the length of the orifice determined by the axial position of the valve plug 26. As the valve plug 26 is moved, the length of the orifice will be varied while the orifice width remains constant resulting in an orifice area which varies linearly with the axial movement of the valve plug 26. Therefore, the fluid flowing from the inlet passage 11 to the outlet passage 12 of the valve body 10 will pass through a series of expansion chambers for a controlled, limited energy dissipation at each stage. In passing from one expansion chamber to the next, the fluid flows through a restricting orifice, the area of which is a function of the axial displacement of the valve plug 26.

Figure 2:
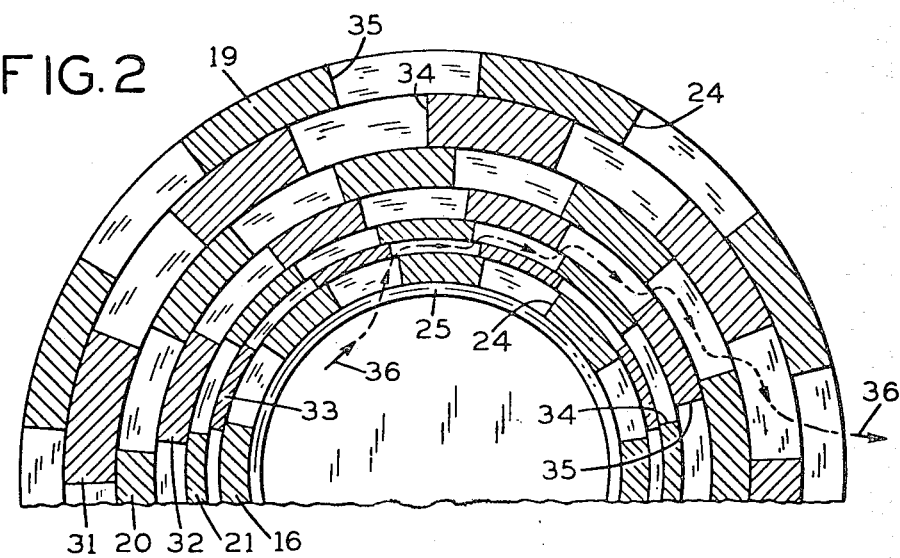
FIG. 2 is a partial cross-sectional view of a valve taken generally along line 2—2 of FIG. 1 and illustrating a cylinder arrangement for a spiral geometry for the path of fluid flow.

In the embodiment of FIGS. 1 and 2, the successive interfitting cylinders increase in wall thickness from inside toward the outside to accommodate progressive expansion of a compressible fluid, such as steam.

Figure 4A:
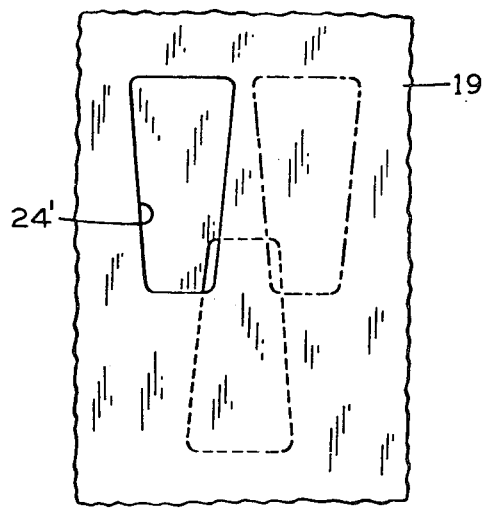
FIGS. 4A and 4B diagrammatically illustrate a trapezoidal geometry for the slot openings of the valve of FIG. 2.
Figure 4B:
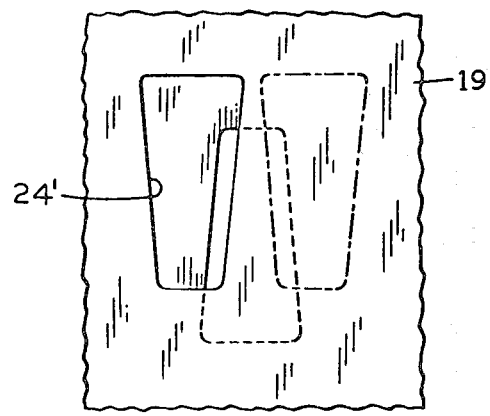

Referring now to FIGS. 4A and 4B, there is diagrammatically illustrated slot openings 24 which are formed to be trapezoidal in shape. In this embodiment, the axial movement between mating cylinders will vary the slot width as well as length due to the slight helix angle of the side edges of each slot opening, as is clearly shown.

Figure 3:
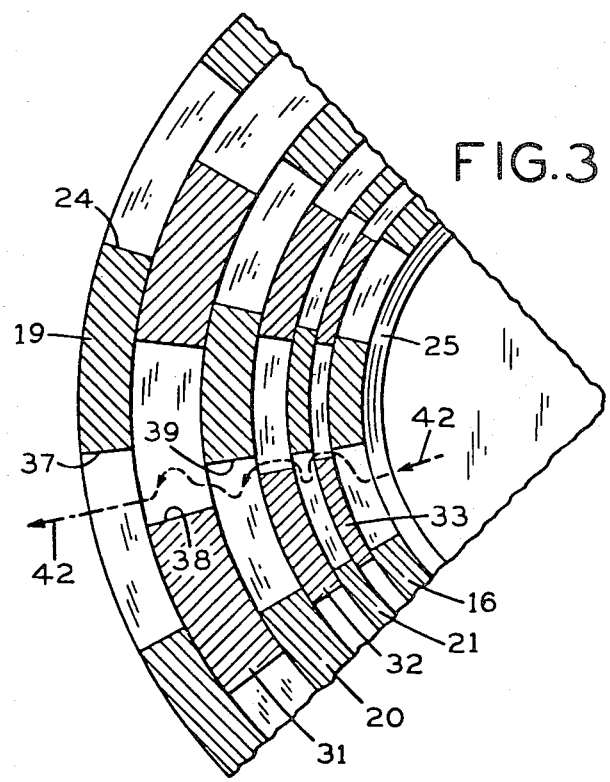
FIG. 3 is a partial cross-sectional view of the valve taken generally along line 3—3 of FIG. 1 and illustrating an alternating geometry for the path of fluid flow.
Figure 5:
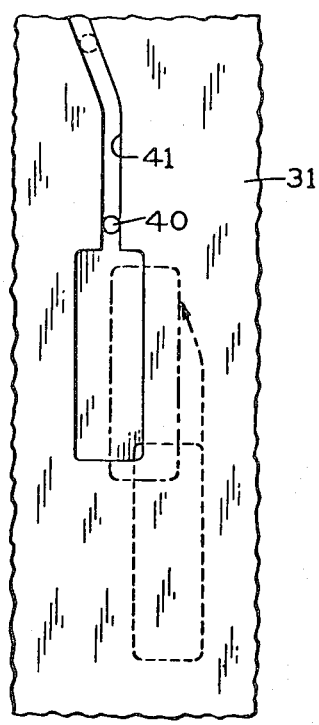
FIG. 5 diagrammatically illustrates a specific feature of the invention wherein one of the cylinders is cammed to rotate as the valve plug is moved axially.

FIG. 3 illustrates another advantageous arrangement for the angular orientation of the interfitting cylinders. In this embodiment, the left side edge 37 of the openings 24 of cylinder 19 overlap the right side edge 38 of the openings 24 of adjacent cylinder 31. The right side edge 38 then overlaps the left side edge 39 of the opening 21 of the next adjacent cylinder 20 and so on to the downstream cylinder 16 whereby each of the fluid flow paths 42 is in the form of a zig-zag about a radial line of the interfitting cylinders. An advantage of this arrangement is that the mating cylinders can be cammed to rotate slightly as they are moved axially. In this manner, the opening or closing of the restricting orifices is proportional to their radii from the axis of the concentric interfitting cylinders and the amount of rotation of the cylinders. The cam may be designed to provide a much greater area for the restricting orifices during high flow or for an emergency dump over only a portion of the working stroke of the valve plug 26. A preferred form for the camming arrangement described above is illustrated in FIG. 5. The outer cylinder 19 is provided with a pin 40 which is slidably received in a cam track 41 formed in the adjacent cylinder 31. As the valve plug 26 is raised to open the valve, the pin 40 will slide along the path 41 and be moved to the left as the track 41 changes direction. This will rotate the valve plug 26, as well as the cylinders 31, 32, 33 mounted thereon, such that the width of the restricting orifices will increase with continued upward movement of the valve plug 26.

Figure 6A:
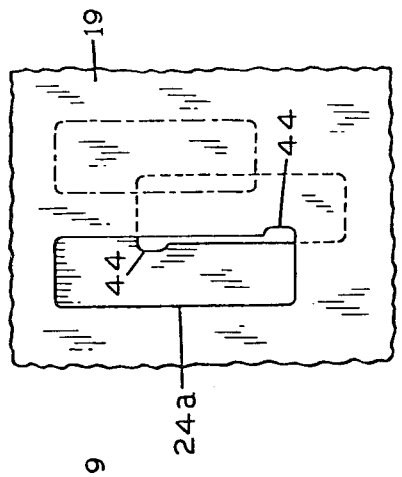
FIGS. 6A and 6B diagrammatically illustrate a self-cleaning feature which may be incorporated into the valve of the present invention.
Figure 6B:
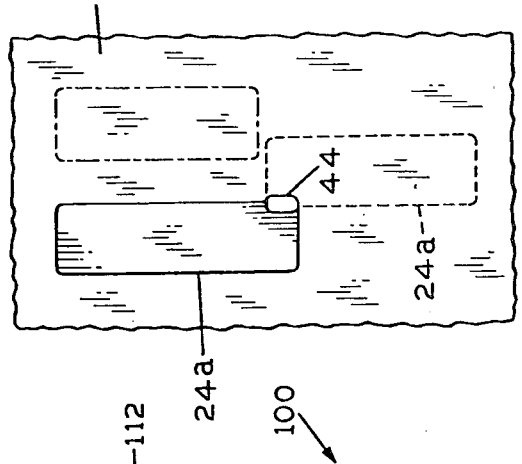

In any of the above-described embodiments, a self-cleaning feature may be incorporated into the slot-like openings. Referring now to FIGS. 6A and 6B, it can be seen that the openings 24a are each provided with an enlarged portion 44 at the corner thereof which first overlaps the side edge of the opening of the contiguous cylinder. As the valve plug 26 is moved downwardly and just prior to a mating relation between the tapered surface 27 of the plug 26 and valve seat 25, the enlarged portions 44 of overlapping openings 24a align to form a widening of the orifice. This is clearly shown in FIG. 6B. The widening will permit small particulate matter, which may have become lodged between the side edges of the openings 24a forming the orifice, to be freed and flushed out. Consequently, the particulate matter will not be jammed between the side edges as the overlaps close.

Another advantageous embodiment of the valve of the present invention is illustrated in FIGS. 7–10. The reference numeral 100 designates a valve body of a fluid control valve such as may be used in controlling liquid flowing under high pressure. The illustrated valve, designed for service with incompressible fluids, includes a valve body 100 provided with an inlet passage 101 and outlet passage 102. As in the embodiment of FIG. 1, a circular shoulder 103 on an opening 104 of an internal web 105 supports a cylindrical member 106. A plurality of spaced, concentric cylinders 107, 108, 109 are securely fastened to a flange 110 at the lowermost part of the cylindrical member 106. A balancing cylinder 111 is supported between the upper end of the cylinder 109 and the bonnet 112 covering the web 105 of the valve body 100.

A valve plug 113 includes outer surfaces 114, 115, 116 which are slidably received within the balancing cylinder 111, cylinder 109 and cylindrical member 106, respectively. Axial movement of the plug 113 is controlled by a valve stem 117 which extends through a guide bore 118 formed in the bonnet 112 and is connected to a suitable actuator (not shown) such as a threaded hand wheel. The cylindrical member 106 includes a tapered annular valve seat 119. A tapered annular valve surface 120 is formed at the lower end of the plug 113 which mates with the valve seat 119 when the plug 113 is in its lowermost position to fully close the valve.

A collar 121 is slidably mounted on the valve stem 117 and rigidly supports the valve plug 113 as by threads. The valve stem 117 is formed to include a lower portion 122 of enlarged diameter and the lower end of said portion 122 is formed to a tapered annular valve surface 123. The valve plug 113 includes a cylindrical opening 124 concentric about the central axis of the plug 113. The upper end of the opening 124 is formed to a tapered valve seat 125 which is arranged to mate with the valve surface 123 at the end of the stem 117. A washer 126 is seated against a shoulder 127 arranged on the stem 117 at the upper end of the enlarged portion 122. A coil spring 128 acts against the washer 126 and an internal shoulder 129 of the valve plug 113, whereby the spring 128 urges the valve surface 123 away from the valve seat 125 when the valve is in an opened condition. Openings 130, 131 are formed in the valve plug 113 and collar 121, respectively.

When the valve is in a closed condition, the stem 117 is forced against the action of the spring 128 to place the valve surface 123 and valve seat 125 in a mating relation. High pressure fluid will leak from the inlet passage 101 to the volume of the web 105 above the valve plug 113 to tend to hold the valve in a tight, closed condition. In the operation of opening the valve, the stem 117 is raised and the action of the spring 128 and slidable connection between the collar 121 and stem 117 will permit the stem 117 to move relative to the valve seat 125 thereby providing fluid communication between the upper and lower surfaces of the valve plug 113 through the openings 124, 130, 131. This will initially release the high pressure above the valve plug 113 to permit an easier opening of the valve. Eventually, the pressure differential between the upper and lower surfaces of the valve plug 113 will hold the plug 113 in a semi-balanced condition for an effective valve action.

In accordance with the invention, the valve plug 113 includes a portion of enlarged diameter 132. A plurality of spaced, concentric cylinders 133, 134, 135 are securely fastened to the surface defined by the portion 132. The cylinders 133, 134, 135 are slidably received in a close-fitting relation between the cylinders 109, 108, 107, 106, respectively. Each of the cylinders is provided with a plurality of narrow axially elongated rectangular slot openings 136.

Figure 8:
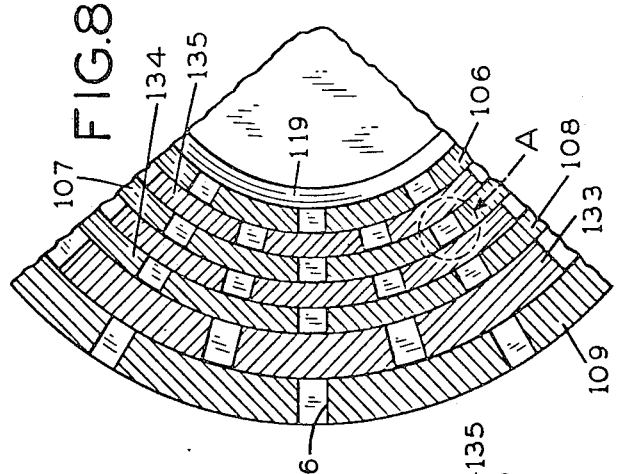
FIG. 8 is a partial cross-sectional view of the valve taken generally along line 8—8 of FIG. 7.
Figure 9:
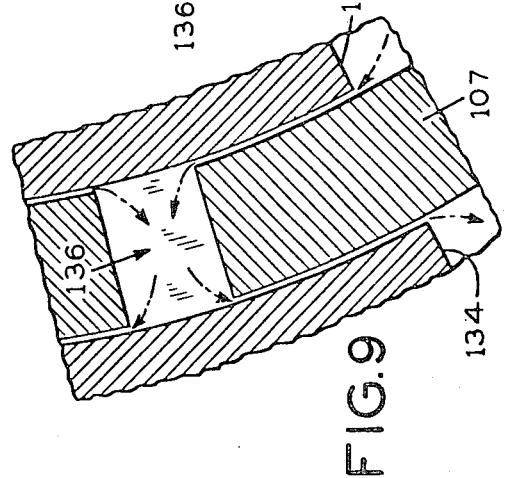
FIG. 9 is an enlarged view of area A of FIG. 8.
Figure 7:
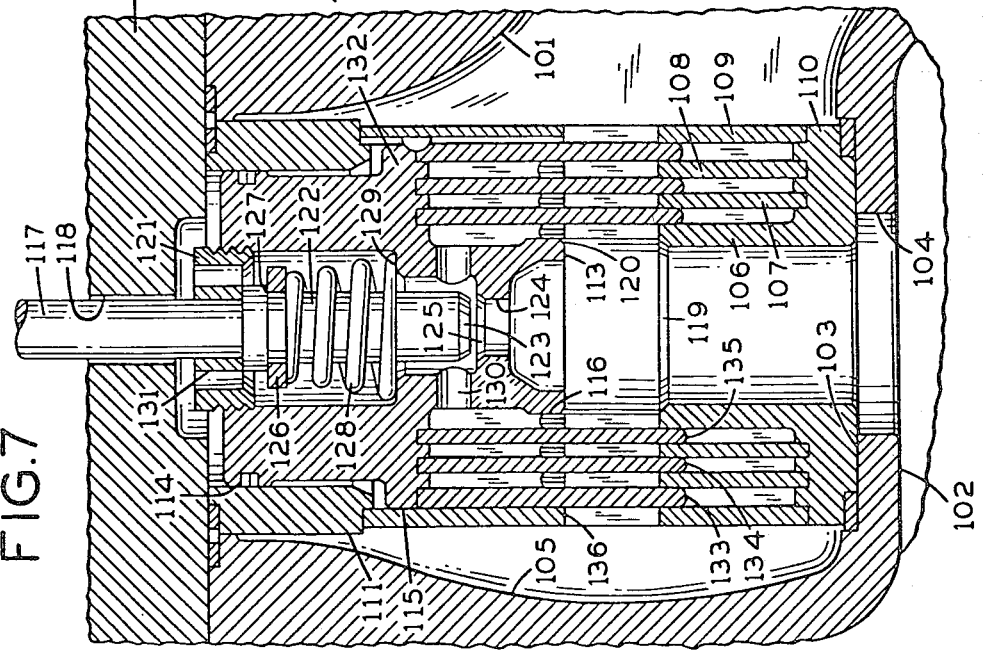
FIG. 7 is a longitudinal cross-sectional view of a high pressure, semi-balanced valve incorporating a laminar geometry for the labyrinth trim of the present invention.

As can be seen in FIG. 8, the slot openings 136 of each cylinder are offset from the slot openings 136 of a contiguous cylinder whereby each slot opening 136 opens to an unbroken surface of the contiguous cylinder and is equidistant between adjacent openings 136 of the contiguous cylinder. Referring now more particularly to FIG. 9, there is shown a greatly enlarged view of Section A of FIG. 8. As can be seen, the interfitting relation between the concentric cylinders is such that a narrow spacing of laminar dimension is left between the cylinders whereby the fluid flowing through the slot opening 136 divides into two streams to flow circumferentially through the narrow spacing to the adjacent two openings of the contiguous cylinder. This arrangement will serve to limit the velocity of the fluid flow by viscous friction between the walls of adjacent cylinders. The height of the flow passage between openings 136 is the radial clearance between the cylinders and its length is the circumferential overlap length between the openings 136. As can be seen in FIGS. 10A, 10B and 10C, the dimensions of the flow path between slot openings 136 will vary with the axial displacement of the cylinders 133, 134, 135. Full flow is achieved when the slot openings 136 are generally aligned as in FIG. 10A. As the valve plug 113 is lowered toward a closed position, the openings 136 of the cylinders 133, 134, 135, attached to the plug 113, will be axially displaced with respect to the openings 136 of the cylinders 109, 108, 107, 106 to reduce the flow path area. The portions of the fluid flow which do not travel in a purely circumferential direction must traverse a longer path and will be much less volumentrically than the flow through the optimum or shortest path illustrated in FIG. 10A. This arrangement is particularly suitable to control fluid flow with a fixed pressure differential.

A specific feature which may be incorporated in the embodiment of FIGS. 7 through 10, is illustrated in FIGS. 11 and 12. Each of the cylinders includes a tapered annular seat portion 137 adjoining an end section 138 of a reduced wall thickness. The interfitting relation between adjacent cylinders is such that there will be a substantially leak-proof fit when the reduced wall section 138 of each cylinder is sandwiched between the main portion of the adjacent cylinders. However, when reduced section 138 of adjacent cylinders overlap, there will be a thin viscous friction flow path 139 between the cylinders whereby fluid may flow from one slot opening 136 in a purely circumferential direction to the slot openings of the adjacent cylinder. As can be seen in FIG. 12, the width of the flow path will vary with the axial displacement of the valve plug 113 while the length will remain constant.

In another modification of the laminar geometry for the valve illustrated in FIGS. 7 through 13, the slot openings 136' may be formed to be triangular in shape. This arrangement will provide a much more drastic reduction in the width of the flow passage with axial displacement of the plug 113.

Another advantageous embodiment of the present invention is depicted in FIG. 14. In this embodiment, the interfitting cylinders 200, 201, 202 are slotless and mate with a narrow clearance between cylinders to provide a viscous friction flow paths 205 for the fluid. The dimensions of the viscous flow paths 205 have been illustrated in an exaggerated manner for descriptive purposes. The fluid will flow axially between the overlapping portions of adjacent cylinders 200, 201 to an expansion chamber 203 defined by the open end 204 of cylinder 201 and the walls of the cylinders 200, 202. The fluid will then continue to flow in the axial direction between the next set of adjacent cylinders 201, 202 and so on. This arrangement for the interfitting cylinders is ideally suited for a pressure-control application of a high pressure valve.

Each of the embodiments described above provides a high pressure valve which is highly reliable and efficient in the control of high pressure fluids. To advantage, the various geometries and slot patterns described above may be arranged in a single valve. For example, a laminar arrangement may be used for the initial stages of the valve stroke for a spiral geometry valve and so on. The valve may be installed for flow from inside of the concentric cylinders outward or from the outside of the concentric cylinders inward. In the embodiments of FIGS. 1-6, flow is from the inside outward which is ideal for compressible fluids (e.g. a gas or vapor). Of course, the cylinder wall thickness can be varied to increase progressively from the downstream cylinder to the upstream cylinder as per FIG. 1 for a more effective control of the compressible fluid. In the embodiments of FIGS. 7-10, the fluid flow is from the outside inward, which is a preferred form for liquid flow applications.

The flow control of the valve of the present invention is normally linear with flow area varying as a function of the valve plug stroke. However, various control profiles may be achieved by utilizing the various trapezoidal and triangular shaped openings or cam action rotation of the cylinder, as described above. Consequently, the present invention provides a valve which is highly versatile, being adaptable by design to many practical applications. The expansion chamber volume, restricting orifice or viscous friction flow path dimensions and flow characteristics may be calculated with great mathematical accuracy and conveniently implement to practical use by the teachings disclosed herein.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A fluid flow restrictor means for use in a passage-forming means conducting high pressure fluid, which comprises
   (a) a plurality of closely interfitting concentric cylinders mounted within said passage-forming means to form an inlet and outlet means for fluid flow,
   (b) alternate ones of said cylinders being arranged for controlled movement with respect to the others of said cylinders,
   (c) a stem element mounted for selective, controlled, axial movement within the confines of said passage-forming means,
   (d) said alternate ones of said interfitting cylinders being associated with said stem element and arranged for a close interfitting relation between said others of said cylinders whereby the selectively controlled axial movement of the stem element selectively varies the axial orientation of the interfitting concentric cylinders,
   (e) each of said cylinders being formed to include straight-lined walls, and
   (f) means forming fluid flow paths through said interfitting concentric cylinders to provide controlled disipation of fluid energy comprising restricted fluid flow paths formed by and between the straight-lined walls of adjacent cylinders and expansion chambers defined by the open end of each cylinder and the confronting straight-lined walls of the two cylinders adjacent thereto,
   (g) the restricted fluid flow paths formed by and between the straight-lined walls of adjacent cylinders each comprising the spacing of uniform width defined by and between and extending throughout the overlapping portions of the straight-lined walls of a pair of interfitting adjacent cylinders,
   (h) said spacing being of laminar dimensions, said laminar dimensions being of uniform width throughout the area of overlap of the straight-lined walls of the interfitting cylinders to provide a restrictive viscous friction fluid flow path of uniform width dimension through said spacing,
   (i) the length dimension of each of said viscous friction fluid flow paths of uniform width laminar dimension and the length dimension of each of said expansion chambers being selectively variable in accordance with the axial orientation of said cylinders determined by said stem element, (j) said interfitting concentric cylinders being arranged and configured whereby the means forming fluid flow paths through the interfitting cylinders provides a multiplicity of fluid flow passages whereby the fluid flows sequentially and repetitively form areas of restriction defined by the spacing of uniform laminar dimensions between the straight-lined walls of adjacent cylinders to areas of expansion defined by the open end of each cylinder and the confronting straight-lined walls of the two adjacent cylinders.

2. The fluid flow restrictor means according to claim 1, further characterized by (a) said passage-forming means comprising a valve body including an inlet passage and an outlet passage, (b) a valve seat arranged intermediate the inlet and outlet passages of said valve body, (c) a valve plug mounted for axial movement within the confines of said valve body and arranged for a mating relation with said valve seat to open and close said valve, (d) said plurality of closely interfitting concentric cylinders being alternately mounted to the valve plug and valve seat whereby the axial movement of said valve plug will displace said alternate ones of the interfitting cylinders with respect to the others of said cylinders.

* * * * *

UNITED STATES PATENT AND TRADEMARK OFFICE
CERTIFICATE OF CORRECTION

PATENT NO. : 4,473,210
DATED : September 25, 1984
INVENTOR(S) : John A. Brighton It is certified that error appears in the above-identified patent and that said Letters Patent are hereby corrected as shown below:

On the title page, the inventors should be listed as follows:

--Inventors: Ira H. Schnall, Erie, Pa.; John A. Brighton, East Lansing, Michigan--

On the title page, the assignee should be listed as follows:

--Assignee: White Consolidated Industries, Inc., Cleveland, Ohio--

Signed and Sealed this

Second Day of April 1985

[SEAL]

*Attest:*

DONALD J. QUIGG

*Attesting Officer*  *Acting Commissioner of Patents and Trademarks*